United States Patent [19]
Seybold

[11] 3,804,396
[45] Apr. 16, 1974

[54] SECURING DEVICE FOR VEHICLE SAFETY BELTS
[76] Inventor: Rolf Seybold, Erichenstrasse 21, Solingen, Germany
[22] Filed: July 24, 1972
[21] Appl. No.: 274,287

[52] U.S. Cl............................. 267/166, 297/386
[51] Int. Cl................................................ F16f 1/06
[58] Field of Search ............ 267/179, 180, 166, 73, 267/74; 297/386, 388

[56] References Cited
UNITED STATES PATENTS
3,126,072  3/1964  Johansson........................... 297/386
2,743,790  5/1956  Bricker............................... 267/180
917,001    4/1909  Chase................................. 267/179
3,482,872  12/1969 Chamberlain....................... 297/386

Primary Examiner—James B. Marbert
Attorney, Agent, or Firm—Holman & Stern

[57] ABSTRACT

A securing device for vehicle safety belts is provided by a helically coiled body made from plastically deformable wire arranged so that the ratio of the average diameter of the helical coils to the diameter of the wire is not greater than 3.5.

6 Claims, 3 Drawing Figures

SECURING DEVICE FOR VEHICLE SAFETY BELTS

BACKGROUND OF THE INVENTION

The invention relates to a securing device for vehicle safety belts.

PRIOR ART

A known securing device of this kind utilizes resilient helical springs as shock-absorbers which, in the event of an accident, are stretched to their yield point or until they break. In this way the spirals of the springs are indeed stretched; however, the total length of the expanded spring when there is an accident is less than the original total length of the wire because in the expanded state the wire assumes a slightly wavy form. Furthermore, in order to prevent the belt from twisting two springs are always required, with said springs being joined at their ends and the belt being connected to one pair of connected ends.

OBJECTS AND SUMMARY OF THE INVENTION

One object of the present invention is to provide an improved securing device for vehicle safety belts in which, in the event of an accident, with shock-absorption is effected with the least possible expense, this being of particular importance for mass production. Another object is to provide a device which has a greater capacity for shock-absorption than is the case with known forms of securing device.

In accordance with the invention, there is provided a securing device for a saftety seat belt for an occupant of a vehicle, said safety device comprising a plastically deformable wire wound into a cylindrical coil which, in use, is connected between the safety belt and the vehicle so that the axis of said coil lies in the expected direction of strain of the belt, the improvement that the ratio of the average coil diameter of said coil to the diameter of the wire forming the coil is considered below the normal ratio for spiral springs and is at the most 3.5.

A coiled body formed as above-described is subject, in the case of an accident, to "multi-dimensional" states of stress and for this reason is able to take a considerably greater strain than if it was subject to a "one-dimensional" state of stress. Surprisingly, when deformation body the coiled bpdy does not unwind, so that a single coiled body is sufficient to secure a belt so that the latter cannot twist. Above all, however, the total length of those coils which are expanded is surprisingly enough greater than the length of the non-deformed wire which is still wound up into a coiled body would indicate. Thus, as a result of the "multi-dimensional" state of stress (i.e. stress made up of bending stresses, torsional stresses, shearing stresses and tensile stresses), there is a decrease in cross-section which is distributed evenly over the whole length of the wire and therefore a corresponding additional expansion. It is a considerable advantage to have a long damping path by making use of this decrease in cross-section which extends evenly over the whole length of the wire because even with a maximum value of the ratio of the average helical diameter to the diameter of the wire of 3.5 (as compared with the usual corresponding ratios with helical springs of 5 to 30), this still does not make it necessary to make the coiled body undesirably long in order to obtain the desired length of damping path. The coiled body can therefore be arranged in such a way that it does not affect the occupants of the car even if there is limited space as is usually the case near vehicle seats.

A stretched length greater than the theoretical length of the wire is still obtained when the stretched wire still has a wavy form emanating from the original coiling. A considerable reduction in cross-section is therefore achieved with lesser forces than the forces which would bring about a corresponding reduction in cross-section with a one-dimensional state of stress.

It is advantageous both with regard to even stressing of the total length of the wire and to the finishing technique, if the wire material is wound in cylindrical helical coils to form the coiled body. Moreover, two coiled bodies, each formed as above described, may be arranged parallel to each other, with said bodies being joined at their ends in a known manner by straps or fittings to one of which the belt is connected and the other of which is fitted to the body of the vehicle. In practice, coiled bodies made of deformable iron wire having a diameter of about 5 mm have been particularly successful.

A multi-state damping is achieved if at least one additional coiled body designed to take stronger deforming forces is arranged in series (i.e. end to and) with the first coiled body. The additional coiled body is then arranged to come into action after the first coiled body, without the latter stretching through expansion in a one-dimensional state of stress.

For connection to an eyelet of the belt or into a joint present on the vehicle, it is convenient to guide the material at each end of the or each coiled body by bending it gradually into the direction of the axis.

In order to illustrate the invention further reference is made to the drawing which shows three alternative embodiments of a securing device for which safety belts are constructed in accordance with the invention.

DETAILED DESCRIPTION OF THE EMBODIMENTS

Figure 1:
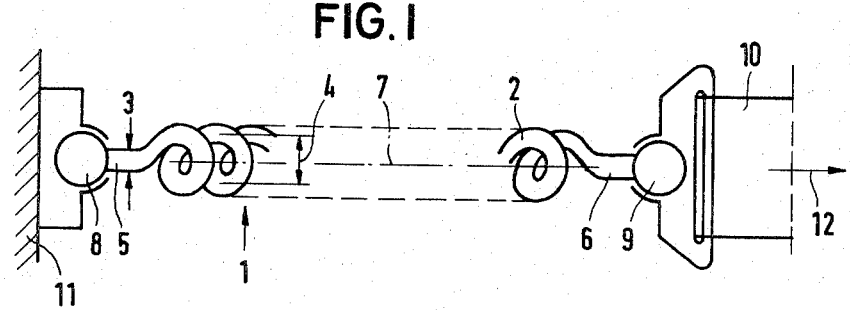
FIG. 1 is a diagrammatic view of a first embodiment of a securing device in accordance with the invention.

Referring firstly to FIG. 1, the securing device shown therein comprises a coiled body 1 which consists of cylindrical helical coils of an iron wire 2 which is about 5 mm thick, with the diameter of the wire being marked 3. The average coil diameter is calculated from wire center to wire center and is marked with the reference numeral 4 in the drawing. In the embodiment in question, 7 mm was chosen for the average coil diameter so that the ratio of average coil diameter to wire diameter is, in this case, 1.4 although ratios up to a maximum of 3.5 are permissible. The end sections marked 5 and 6 are bent by gradual curving into the direction of the helical axis 7 and are spherically thickened at their ends 8 and 9 so that ball and socket joints can be formed in a particularly convenient manner at both ends of the coiled body 1. Thus, a belt 10 is connected to end 9 by fitting to form one ball and socket joint, whereas another fitting secured to a vehicle 11 forms with the end 8 a further ball and socket joint.

In the event of an accident occurring to the vehicle in which the device is fitted, expansion of the coiled body occurs as a result of the applied stress, with said stress extending in the direction of the arrow 12, and an even damping force arises along almost the whole expansion path. The damping force required for an almost full expansion is, with such coiled body, 2.5 times as high as one would expect with a theoretical, one-dimensional load. The manufacture of this coiled body is, therefore, not only very simple from the point of view of the fabrication but, in addition, material costs are very low. In the drawing, the coils of the coiled body are shown separated a little so that they can be seen more clearly. In practice, however they lie very close to each other so that the overall length of the coiled body is in reality shorter.

Figure 2:
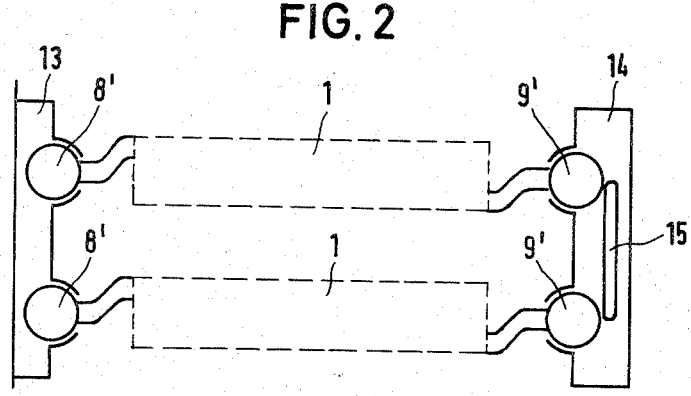

FIG. 2 shows how two coiled bodies which are marked 1' in the view can be arranged parallel to one another. Each of the two coiled bodies is equipped at its ends with spherical ends 8' and 9' and the ends 8' form ball and socket joints with a connection piece 13 which is joined, in use, to the body of the vehicle, with said body not being shown in the drawing. In a corresponding manner the ends 9' form ball and socket joints in an eyelet 14 of the belt, and in a longitudinal slot 15 of which the belt is held, with said belt also not being shown in the drawing.

Figure 3:
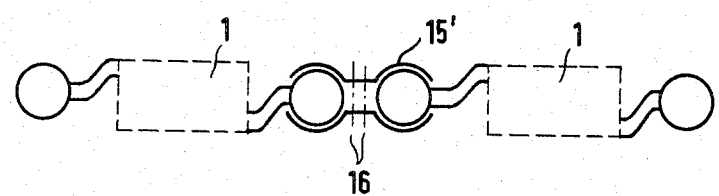
FIGS. 2 and 3 are views similar to FIG. 1 of second and third embodiments of the invention.

The damping force offered by the embodiment shown in FIG. 1 would increase rapidly only at the end of expansion if there is then a more or less one-dimensional state of tensile stress. Such a situation can be avoided by providing a further coiled body of greater damping force as shown in FIG. 3, with the two bodies being connected together in series, i.e. in an end to end relationship. The method of securing these coiled bodies to the vehicle and to the eyelet of the belt is the same as in FIG. 1 and has not been shown in greater detail. The two coiled bodies 1'' are joined here by a spacer 15' which can, for instance, consist of two shaped bodies connected by means of bolts 16 and forming two further ball and socket joints.

What I claim is:

1. A securing device for a safety seat belt for an occupant of a vehicle, said safety device comprising a plastically deformable wire wound into a cylindrical coil which in use is connected between the safety belt and the vehicle so that the axis of said coil lies in the expected direction of strain of the belt, the improvement that the ratio of the average coil diameter of said coil to the diameter of the wire forming the coil is considerably below the normal ratio for spiral springs and is at the most 3.5.

2. The securing device as claimed in claim 1, in which the wire is coiled up in cylindrical helical coils to form the coil.

3. The securing device as claimed in claim 1, in which there are provided at least two cylindrical coils arranged parallel to each other and, the adjacent ends of said coils being connected together so that in use one set of adjacent ends is connected to the belt and the other set of adjacent ends is connected to the vehicle.

4. The securing device as claimed in claim 1, in which the coil is formed from deformable iron wire having a diameter of about 7 mm.

5. The securing device as claimed in claim 1, in which there is provided at least one additional cylindrical coil connected in series with said cylindrical coil.

6. The securing device as claimed in claim 1, in which the wire at each end of the cylindrical coil is bent by gradual curving into the direction of the axis of the coil.

* * * * *